US010749352B2

(12) United States Patent
Shim

(10) Patent No.: US 10,749,352 B2
(45) Date of Patent: Aug. 18, 2020

(54) HYBRID CHARGING/DISCHARGING SOLAR ENERGY STORAGE APPARATUS

(71) Applicant: KYUNG IL GREEN TECH CO., LTD., Seosan-si, Chungcheongnam-do (KR)

(72) Inventor: Eon Kyu Shim, Yongin-si (KR)

(73) Assignee: KYUNG IL GREEN TECH CO., LTD., Seosan-si, Chungcheongnam-Do (KR)

( * ) Notice: Subject to any disclaimer, the term of this patent is extended or adjusted under 35 U.S.C. 154(b) by 144 days.

(21) Appl. No.: 16/212,135

(22) Filed: Dec. 6, 2018

(65) Prior Publication Data
US 2019/0199104 A1 Jun. 27, 2019

(30) Foreign Application Priority Data
Dec. 22, 2017 (KR) .......... 10-2017-0178173

(51) Int. Cl.
*H02J 7/00* (2006.01)
*H02J 7/35* (2006.01)
*H02J 7/34* (2006.01)

(52) U.S. Cl.
CPC .............. *H02J 7/0014* (2013.01); *H02J 7/35* (2013.01); *H02J 7/345* (2013.01)

(58) Field of Classification Search
None
See application file for complete search history.

(56) References Cited

U.S. PATENT DOCUMENTS

| 2015/0037624 A1* | 2/2015 | Thompson .......... H01M 10/482 |
| | | 429/50 |
| 2017/0310128 A1* | 10/2017 | Cheng ........................ H02J 7/00 |
| 2018/0076663 A1* | 3/2018 | Gudgel .................... H02J 3/386 |
| 2018/0166892 A1* | 6/2018 | Sepe, Jr. ................ H02J 7/0091 |

FOREIGN PATENT DOCUMENTS

| KR | 10-2012-0072788 A | 7/2012 |
| KR | 10-2014-0130232 A | 11/2014 |
| KR | 10-1663991 B1 | 10/2016 |

OTHER PUBLICATIONS

Korean Office Action for related KR Application No. 10-2017-0178173 dated Nov. 20, 2018 from Korean Patent Office.

* cited by examiner

*Primary Examiner* — Jared Fureman
*Assistant Examiner* — Joel Barnett
(74) *Attorney, Agent, or Firm* — Paratus Law Group, PLLC

(57) ABSTRACT

A hybrid charging/discharging solar energy storage apparatus includes: a solar power generator configured to receive incident solar light and generate electricity; a power converter configured to receive at least power generated by the solar power generator as input power and convert the input power into output power by changing a voltage of the input power; an energy storage unit comprising a plurality of modules configured to store power; a load connection line connected to a load configured to consume power of at least one of the power converter and the energy storage unit; and a power controller configured to control charging and discharging of the energy storage unit according to preset charging/discharging policies.

11 Claims, 4 Drawing Sheets

HYBRID CHARGING/DISCHARGING SOLAR ENERGY STORAGE APPARATUS

CROSS-REFERENCE TO RELATED APPLICATION(S)

This application claims the benefit under 35 USC § 119(a) of Korean Patent Application No. 10-2017-0178173, filed on Dec. 22, 2017, in the Korean Intellectual Property Office, the entire disclosure of which is incorporated herein by reference for all purposes.

BACKGROUND

1. Field

The following description relates to a charging/discharging solar energy storage apparatus, and more specifically, to a hybrid solar energy storage apparatus with charging and discharging (hereinafter, referred to as a "hybrid charging/discharging solar energy storage apparatus") capable of improving the lifespan of a battery and also capable of charging a solar battery having an unstable output pattern in an optimal charging mode.

2. Description of Related Art

In general, as a result of global climate change, the crisis of environmental destruction and high oil prices, as well as the resource depletion crisis, have taken places, and as the depletion of petroleum energy and the pollution of the environment have been accelerated, the Kyoto Protocol to prevent global warming has taken effect, so that development of technology for the use of new and renewable energy in an attempt to suppress carbon dioxide emission is emerging as an urgent task.

Under such circumstances, the direction of technology development focuses on the development of new and renewable energy using natural energy, such as wind, tidal, solar, and water power. Also, the development is being actively carried out in an effort to minimize a loss rate by improving energy systems or devices that are treated as losses in a storage system that stores renewable energy, regenerative energy generated when braking an automobile or an electric vehicle, and the like.

Meanwhile, an energy storage method is largely classified into an energy storage method (capacitor storage method) using a supercapacitor module that is drawing attention as a next generation energy storage apparatus and an energy storage method (battery storage method) using a battery module consisting of lithium batteries, and both storage methods, on which technology development is concentrated, have advantages and disadvantages.

In the capacitor energy storage method, it is difficult to reduce peak power and discharge is possible only for a short period time, and hence energy storage efficiency is much lower than the battery storage method, but the power factor correction is easy because a response speed is high. In addition, with the rapid expansion of energy storage capacity of a capacitor, ultra-high capacity supercapacitors are being introduced, and accordingly the capacitor energy storage method is becoming more useful. As a result of demonstration in various countries, low power charging was possible on cloudy days that may be a problem in using solar light having an unpredictable output pattern, fast charging was possible in normal times, and same-day charging with solar light and same-day use were possible.

In the battery energy storage method, the power factor correction is not easy since a response speed is slow, but it is easy to reduce peak power, and energy storage efficiency is high because long-term discharge is possible. However, as compared with a supercapacitor capable of charging/discharging one million times, a battery has a short lifespan, which causes high maintenance costs, is harmful to the environment, and may not be properly charged depending on the solar light environment due to a high energy density. To solve a problem that the battery is not charged on rainy and cloudy days, an additional battery capacity is designed and applied by technically applying the concept of the number of sunless days, but this is not a fundamental measure because the battery has a high energy density and a short lifespan.

The battery and the supercapacitor can be used as an energy storage apparatus only when a plurality of batteries or supercapacitors are assembled into a module. In a module composed of multiple batteries or supercapacitors, voltage deviation between the batteries or between the supercapacitors occurs, and the most basic method for technically stabilizing the voltage deviation is to apply a cell balance circuit. This is because, when the voltage balance between cells is lost, batteries and supercapacitors may cause a fire and the life span thereof can rapidly decrease.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a hybrid charging/discharging solar energy storage apparatus, which allows a hybrid energy storage unit composed of supercapacitors and batteries to be charged with a maximum generation power of an input power source by using solar-generated power source, allows charging even when solar-generated power is low, and allows cell balancing for capacitors to be performed without unnecessary energy consumption.

In one general aspect, there is provided an energy storage apparatus including: a solar power generator configured to receive incident solar light and generate electricity; a power converter configured to receive at least power generated by the solar power generator as input power and convert the input power into output power by changing a voltage of the input power; an energy storage unit comprising a plurality of modules configured to store power; a load connection line connected to a load configured to consume power of at least one of the power converter and the energy storage unit; and a power controller configured to control charging and discharging of the energy storage unit according to preset charging/discharging policies, wherein some of the plurality of modules that are connected in series constitute a plurality of stacks, the plurality of stacks are divided into a capacitor stack group of capacitor stacks consisting of capacitor modules and a battery stack group of battery stacks consisting of battery modules, a charging policy of the charging/discharging policies includes a stack charging mode in which at least one stack of the plurality of stacks is charged with the output power, a module charging mode in which at least one module belonging to the plurality of stacks is charged with the output power, and an inter-stack charging mode in which at least one stack of the battery stack group is charged with power of at least one stack of the capacitor stack group, and the power controller controls charging in at least one of the stack charging mode, the module charging mode, and the inter-stack charging mode, according to the charging policy.

The power controller may include: a first switch group configured to interrupt unidirectional current from the power controller to the plurality of stacks; a second switch group configured to interrupt unidirectional current from the load connection line to the plurality of battery stacks; a third switch group configured to interrupt unidirectional current from the capacitor stack group to the load connection line; and a fourth switch group configured to interrupt unidirectional current from the battery stack group to the load connection line, and the power controller may control stack charging through switching of the first switch group, control inter-stack charging using the second and third switch groups, and control stack discharging using the third and fourth switch groups.

The power controller starts in the stack charging mode at the start of charging, and when the solar power generator is generating electricity and an input voltage of the power converter is lower than a preset voltage, which is an abnormal charging condition, the power controller may control charging in at least one of the module charging mode and the inter-stack charging mode and an initial starting mode may be the module charging mode.

When the solar power generator is generating electricity, the power controller may continuously perform the module charging and the module charging may be performed on at least one of the plurality of capacitor modules.

The inter-stack charging mode may include a stack power module charging mode in which a module of one stack of the plurality of stacks is charged using power of another stack of the plurality of stacks.

The power controller may perform cell balancing through the module charging for a module having a lower voltage than those of the other modules in the same stack, thereby increasing a voltage of the corresponding module.

When power generation of the solar power generator is terminated and the cell balancing through the module charging is required, the power controller may connect power of at least one stack that does not need cell balancing among the plurality of stacks to an input terminal of the power converter and performs the module charging.

The power controller may determine whether a module that is being charged is defective, on the basis of charging time of the module.

The power converter may include a vertical axis power supply mode and a horizontal axis power supply module, the vertical axis power supply module may convert the input power into power necessary for the stack charging and supplies the converted power, and the horizontal axis power supply module may convert the input power into power necessary for the module charging and supplies the converted power.

The energy storage apparatus may further include a charge control module configured to charge modules belonging to a first horizontal module group and a second horizontal module group of horizontal module groups consisting of modules that are electrically connectable to each other and belonging to different stacks among the plurality of modules, wherein the charge control module includes a first line connected to an anode of the horizontal power supply module, a second line connected to one of the anode and a cathode of the horizontal axis power supply module, a third line connected to the cathode of the horizontal axis power supply module, a first three-way switch connecting the anode of the horizontal axis power supply module to one of the first and second lines, a second three-way switch connecting the cathode of the horizontal axis power supply module to one of the second and third lines, a first switch disposed between the first and second lines and configured to interrupt the first line and an anode of a first module in the first horizontal module group, a second switch disposed between the second and third lines and configured to interrupt the second line and an anode of a second module in the second horizontal module group, and a third switch configured to interrupt a cathode of the second module and the third line, and a cathode of the first module and the anode of the second module are electrically connected to each other.

The charge controller may charge one of the first and second modules, control the first and second three-way switches and the first and second switches so that the first module is connected to the anode and the cathode of the horizontal axis power supply module through the first and second lines at the time of charging the first module, and control the first and second three-way switch and the second and third switches so that the second module is connected to the anode and the cathode of the horizontal axis power supply module through the second and third lines at the time of charging the second module.

Other features and aspects will be apparent from the following detailed description, the drawings, and the claims.

Figure 1:
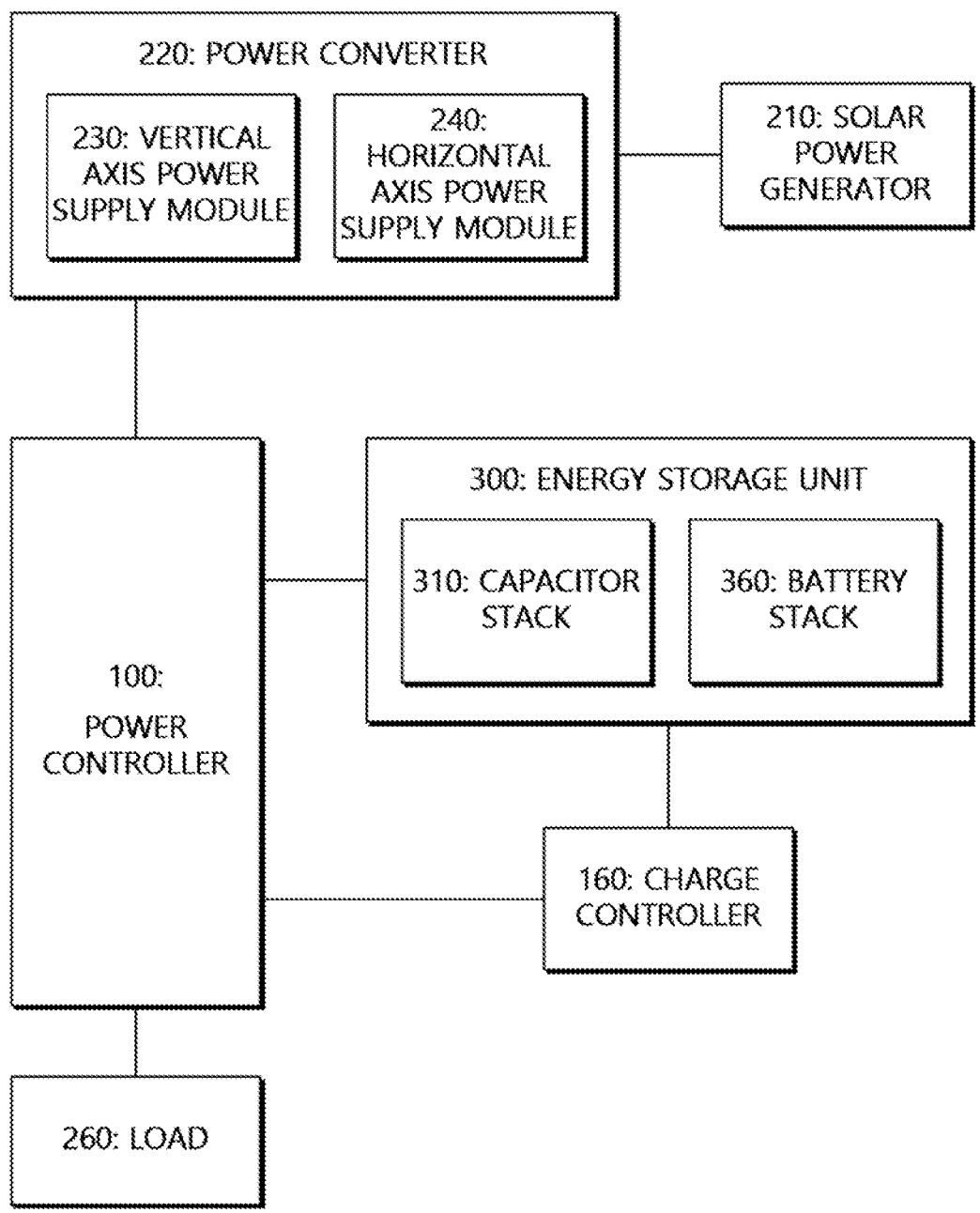
FIG. 1 is a block diagram illustrating a hybrid charging/discharging solar energy storage apparatus according to one embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, the present invention will be described in more detail with reference to the accompanying drawings.

It will be understood that, although the terms first, second, etc. may be used herein to describe various elements, these elements should not be limited by these terms. These terms are only used to distinguish one element from another. For example, a first unit could be termed a second unit, and, similarly, a second unit could be termed a first unit without departing from the teachings of the disclosure. As used herein, the term "and/or" includes any and all combinations of one or more of the associated listed items. As used herein, the singular forms "a," "an," and "the" are intended to include the plural forms as well as the singular forms, unless the context clearly indicates otherwise.

When an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. In addition, it is understood that when a first element is connected to or accesses a second element in a network, the first element and the second element can transmit and receive data therebetween.

In the following description, usage of suffixes such as "module" or "unit" used for referring to elements is given merely to facilitate explanation of the present invention, without having any significant meaning by itself. Thus, the "module" and "unit" may be used together.

When the elements described herein are implemented in the actual applications, two or more elements may be combined into a single element, or one element may be subdivided into two or more elements, as needed. Throughout the drawings and the detailed description, unless otherwise described, the same drawing reference numerals are understood to refer to the same elements, features, and structures.

Figure 2:
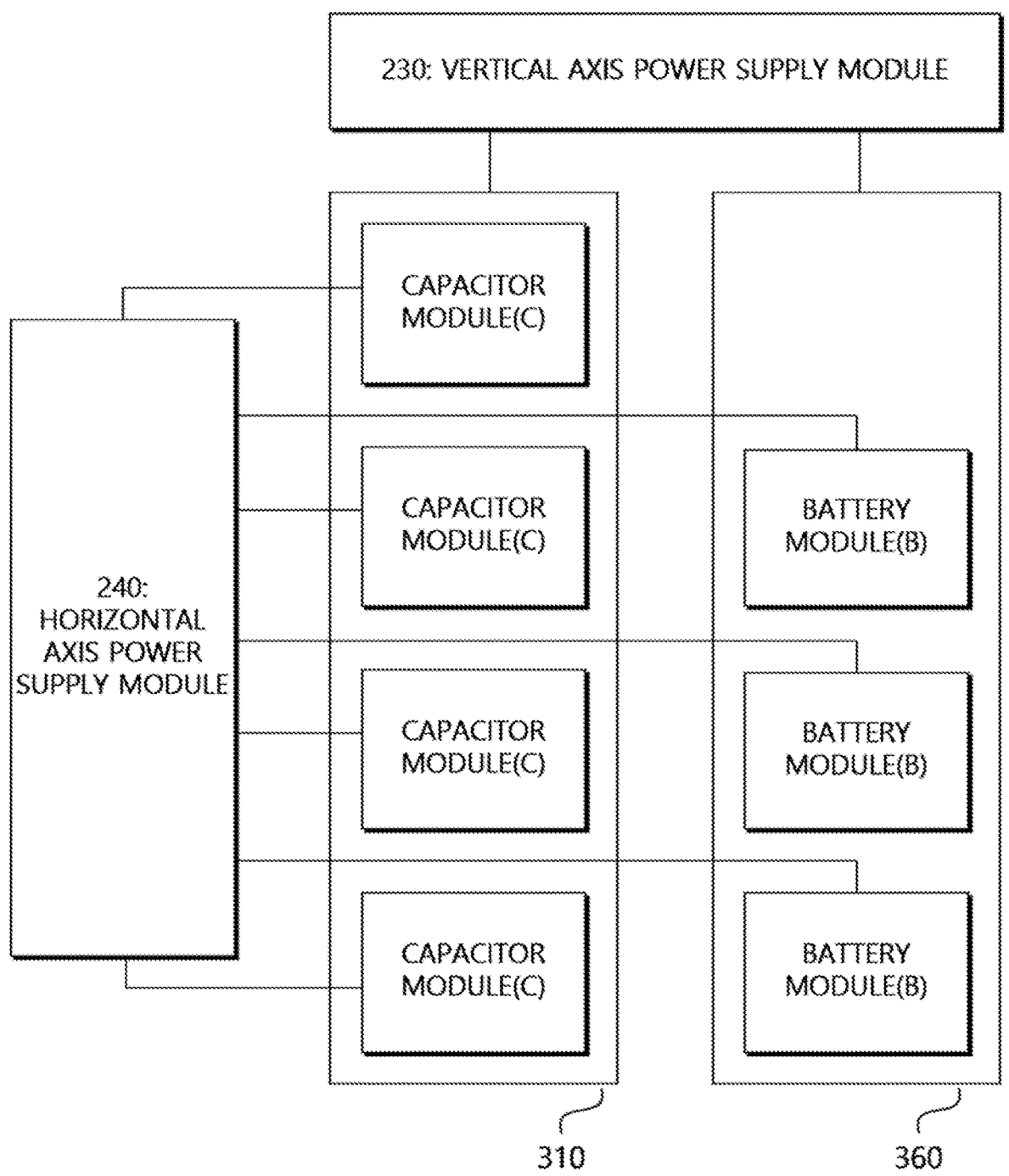
FIG. 2 is a block diagram illustrating an energy storage unit of FIG. 1.

FIG. 1 is a block diagram illustrating a hybrid charging/discharging solar energy storage apparatus according to one embodiment of the present invention, and FIG. 2 is a block diagram illustrating an energy storage unit of FIG. 1.

Referring to FIGS. 1 and 2, the hybrid charging/discharging solar energy storage apparatus may include a power controller 100, a charge controller 160, a solar power generator 210, a power converter 220, and an energy storage unit 300.

The solar power generator 210 may produce electric power. The solar power generator 210 may generate electric power using, as a power generation source, at least one of solar light generation, hydroelectric power generation, wind power generation, tidal power generation, and regenerative power generated by braking an automobile or an electric vehicle. Hereinafter, it is assumed that the solar power generator 210 is a power generation source for photovoltaic power generation. The solar power generator 210 may receive incident solar light and generate direct current (DC) electricity. The solar power generator 210 may generate alternating current (AC) electricity in addition to DC electricity.

The power converter 220 may receive at least DC electricity generated by the solar power generator 210 and convert the DC electricity into a required output power by increasing or decreasing voltage. Meanwhile, input/output voltages of the power converter 220 may be various combinations of AC and DC. The power converter 220 is preferably a DC output in order to charge a battery or a capacitor, which will be described below.

The power converter 220 may receive power of the energy storage unit 300 when necessary, and may output power at an appropriate voltage. When cell balancing is required after the generation of the solar power generator 210 is terminated, the power converter 220 may charge a module using the power of the energy storage unit 300, which will be described below in detail.

The power converter 220 may include a vertical axis power supply module 230 and a horizontal axis power supply module 230. The vertical axis power supply module 230 may supply power required for charging stacks, which will be described below, and the horizontal axis power supply module 240 may supply power required for charging the module. The horizontal axis power supply module 240 may be composed of a plurality of power supply units that are independent of each other.

The power converter 220 may further include a smoothing module (not shown) for suppressing a variation in input power input from the solar power generator 210 and a filter module (not shown) for removing noise.

The energy storage unit 300 may store the power converted in the power converter 220. In order to store the power, the energy storage unit 300 may include a plurality of modules B and C that store power.

Referring to FIG. 2, the plurality of modules B and C may include capacitor modules C and battery modules B. Each of the capacitor modules C may include a high capacity capacitor. Each of the battery modules B may include a battery.

The plurality of modules B and C may constitute a plurality of stacks. The stack refers to modules that are electrically connected in series. The plurality of stacks may be divided into a capacitor stack 310 of the capacitor modules C and a battery stack 360 of the battery modules B. A plurality of capacitor stacks 310 and a plurality of battery stacks 360 may be provided. Preferably, the capacitor stack 310 is composed of a predetermined number of capacitor modules C, and the battery stack 360 is composed of a predetermined number of battery modules B. It may be preferable that the number of modules of the battery stack 360 is less than the number of modules of the capacitor stack 310 because the voltage of the battery module B is generally higher than the voltage of the capacitor module C.

The power controller 100 may control driving of the power converter 220. The power controller 100 may control charging and discharging methods of the capacitor stack 310 and the battery stack 360.

The power controller 100 may control charging and discharging of the energy storage unit 300 according to a predetermined charging/discharging policy. The charging/discharging policy may include at least a charging policy for charging the energy storage unit 300 and a discharging policy for transferring at least the power of the energy storage unit 300 to a load 260. According to the policy, charging and discharging of the energy storage unit 300 may proceed in various modes depending on a set time zone, a power generation environment, and the like.

The charging policy may have a number of charging modes. The charging mode is classified according to the charging method. The charging mode may include a stack charging mode, a module charging mode, and an inter-stack charging mode, depending on a power source, a direction, and a target to be charged. Hereinafter, to describe each charging mode, it is assumed that there are a plurality of capacitor stacks 310 and a plurality of battery stacks 360.

Stack charging means that at least one stack of the plurality of capacitor stacks 310 and the plurality of battery stacks 360 is charged with the output power of the power converter 220. An input power of the power converter 220 is preferably a power of the solar power generator 210.

Module charging means that at least one of the modules B and C is charged with the output power of the power converter 220. An input power of the power converter 220 is preferably the power of the solar power generator 210 when the solar power generator 210 is generating power or the power of the energy storage unit 300 when the power generation of the solar power generator 210 is completed.

Inter-stack charging means that at least one stack of the plurality of battery stacks 360 is charged with the power of at least one stack of the plurality of capacitor stacks 310.

The stack charging, the inter-stack charging, and the module charging may be referred to as a stack charging mode, an inter-stack charging mode, and a module charging mode, respectively.

The power controller 100 may control the power of the solar power generator 210 to be directly supplied to the energy storage 300 when necessary. In this case, the power conversion in the power converter 220 is omitted, which may lead to an increase in energy efficiency.

The power controller 100 may include an input power detection module (not shown), an output power detection module (not shown), a storage power detection module (not shown), a temperature detection module (not shown), and a load control module (not shown).

The input power detection module may detect a characteristic of the input power supplied from the solar power generator 210 to the power converter 220.

The input power detection module may measure a no-load state, that is, an open-circuit voltage of the solar power generator 210. The open-circuit voltage may be used to determine the maximum power of photovoltaic power generation. This is because photovoltaic power generation has the maximum power output at the maximum power point and the maximum power point may be set to a specific percentage (e.g., 78%) relative to the open-circuit voltage.

The open-circuit voltage of the solar power generator 210 may be used as a factor to determine whether the energy storage unit 300 is discharged and/or the load 260 is operated at sunset. For example, in a case in which the load 260 is a street light, when the open-circuit voltage of the solar power generator 210 is lower than a voltage of the energy storage unit 300 by a predetermined voltage (e.g., 0.7 V) or more, the street light may be turned on. In this case, a requirement for turning on the light may be set such that the light is turn on when the voltage difference is maintained for a predetermined time (e.g., one minute) or longer.

The output power detection module may detect a characteristic of the output power from the power converter 220.

The power controller 100 may control charging and discharging of the energy storage unit 300 according to the characteristics of the input and/or output power detected by the input power detection module and/or the output power detection module.

A solar cell has a property that a drawn current is determined by a voltage of a connected load. In addition, the maximum power point of solar power generation may vary depending on solar cell temperature, the solar radiation amount, and the change of external temperature. Thus, the temperature detection module may detect temperature information of the energy storage unit 300 and temperature information of the solar power generator 210.

Because of fluctuating weather conditions, it is difficult to predict an output pattern of photovoltaic power generated by the solar power generator 210. According to the present embodiment, the power controller 100 may identify the output of the photovoltaic power on the basis of the detected characteristic of the input power. In addition, the power controller 100 may control an output voltage of the power controller 220 through the detected characteristic of the output power. With this control, it is possible to maintain the maximum power point during solar power generation. The maximum power point of the solar cell may be defined as $P(Max)=(Im \times Vm) \times 0.78$. It is possible to obtain the maximum output of the solar cell by maintaining the maximum power point. Accordingly, solar cell efficiency and charging efficiency can be increased. In the case of abnormal conditions due to cloud or snow, the maximum power point of solar power generation may be redefined as 75 to 90% of normal conditions.

The storage power detection module may detect a characteristic of storage power stored in the energy storage unit 300. The storage power detection module may detect characteristics of power stored in each of the stacks 310 and 360 of the energy storage unit 300 and characteristics of power stored in each of the modules C and B in the respective stacks.

The load 260 may operate with at least power supplied from the energy storage unit 300. The load control module may control load according to a load characteristic of the load 260.

The charge controller 160 may apply power to at least one of the plurality of capacitor modules C and the plurality of battery modules B according to a control signal of the power controller 100, thereby controlling the corresponding module to be individually charged.

The energy storage apparatus may further include a storage unit (not shown), a user input unit (not shown), and an output unit (not shown). The storage unit may store programs for processing and controlling the power controller 100 and the charge controller 160. In addition, the storage unit may store preset policies, input data, and so on. The user input unit may generate key input data that is input by a user for controlling an operation of the apparatus, and the power controller 100 or the like may control an operation corresponding to the key input data. The output unit may output an audio or video signal.

Hereinafter, charging/discharging of the energy storage apparatus will be described. It is assumed that the solar power generator 210 generates photovoltaic power and the load 260 is a standalone street light.

Figure 3:
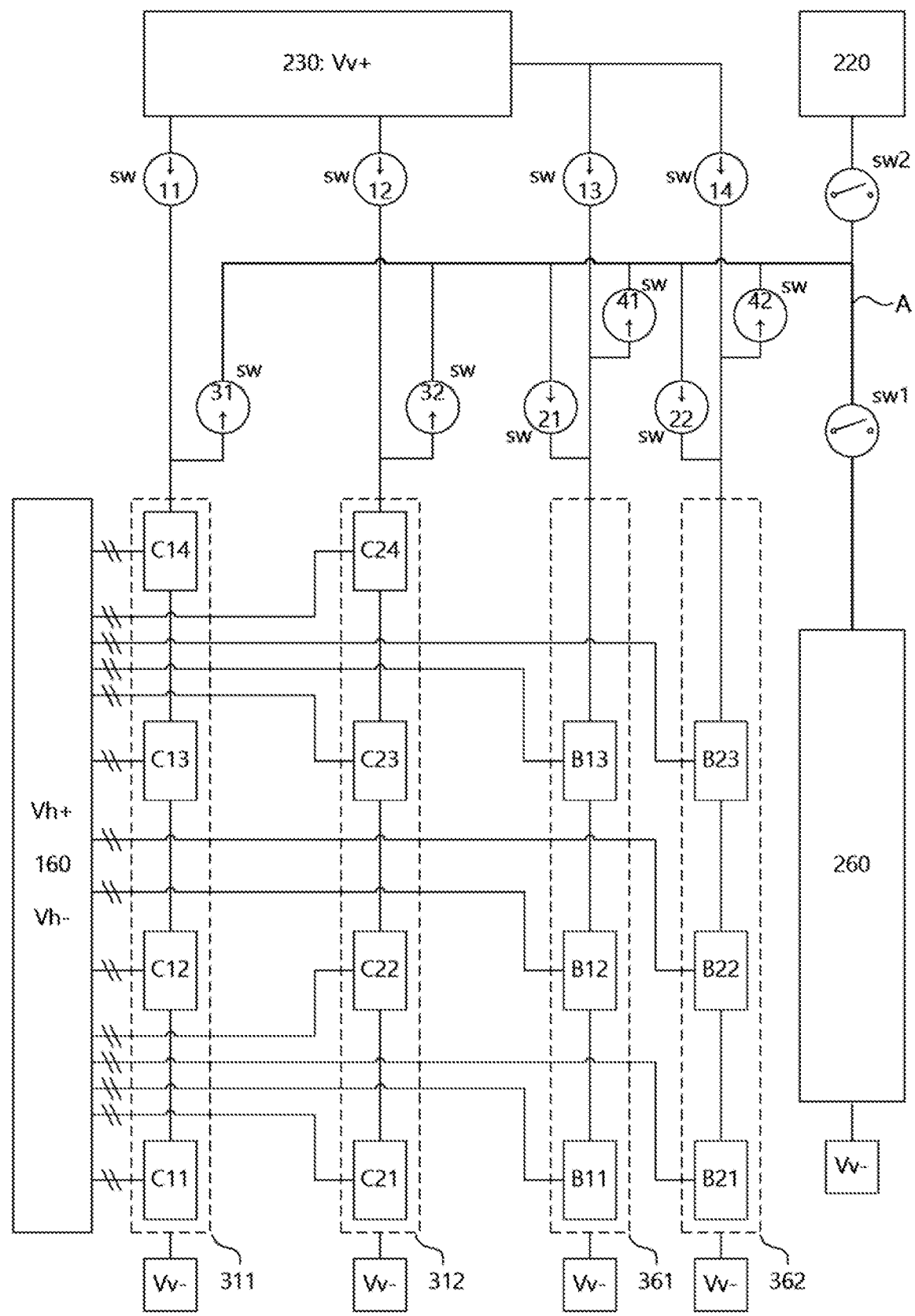
FIG. 3 is an energy charging/discharging circuit diagram.
Figure 4:
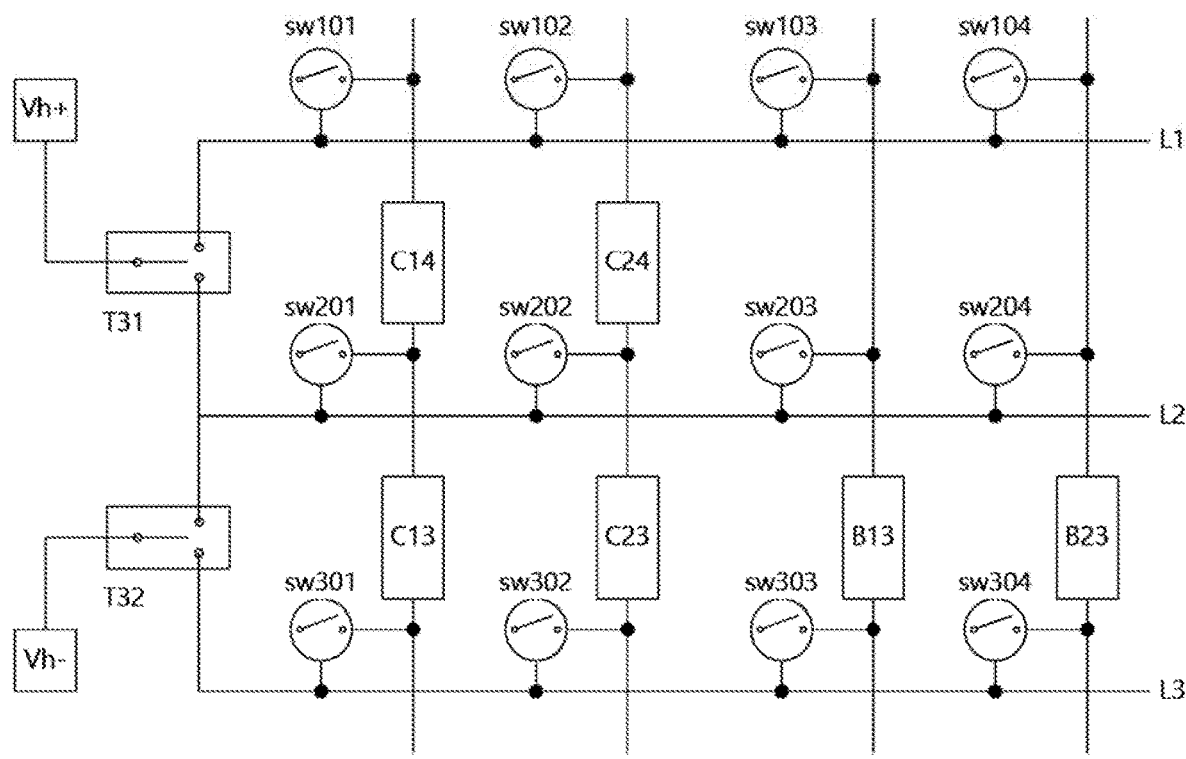
FIG. 4 is an individual charging circuit diagram of the charge controller of FIG. 3.

FIG. 3 is an energy charging/discharging circuit diagram, and FIG. 4 is an individual charging circuit diagram of the charge controller of FIG. 3. For reference, an electrical connection of any two lines may be represented by a vertical intersection point in FIG. 3 and be represented by an intersection point emphasized by a dot in FIG. 4.

Referring to FIG. 3, a first capacitor stack 311 may include a first group of capacitor modules C11, C12, C13, and C14 connected in series. A second capacitor stack 312 may include a second group of capacitor modules C21, C22, C23, and C24 connected in series. A first battery stack 361 may include a first group of battery modules B11, B12, and B13 connected in series. A second battery stack 362 may include a second group of battery modules B21, B22, and B23 connected in series.

The power controller 100 may include switches sw1, sw2, sw11 to sw14, sw21, sw22, sw31, sw32, sw41, and sw42 and transmit a control signal to one of the switches to control switching of the corresponding switch.

Hereinafter, for convenience of description, a lead wire connected to the load 260 will be referred to as a "load connection line A," eleventh to fourteenth switches sw11 to sw14 will be referred to as a "first switch group SW1," twenty-first and twenty-second switches sw21 and sw22 will be referred to as a "second switch group SW2," and thirty-first and thirty-second switches sw31 and sw32 will be referred to as a "third switch group SW3," and forty-first and forty-second switch sw41 and sw42 will be referred to as a "fourth switch group SW4."

The switches described in the present specification may be composed of various semiconductor switches or relays. On/off switching or the change of a contact state of each switch may be carried out according to a control signal of the power controller 100 or the charge controller 160.

Each switch sw11 to 14 in the first switch group SW1 may be disposed on a connection line that connects one end of each of a plurality of stacks 311, 312, 361, and 362 to an anode Vv+ (hereinafter referred to as a "vertical axis anode Vv+") of the vertical axis power supply module 230. The other end of each the plurality of stacks 311, 312, 361, and 362 may be connected to a cathode Vv− (hereinafter referred to as a "vertical axis cathode Vv−") of the vertical axis power supply module 230. The vertical axis cathode Vv− may be an electrode independent of other electrodes. However, the embodiment is not limited to the above description, and the vertical axis cathode Vv− may be connected to a cathode Vh− of the horizontal axis power supply module 240 or may be grounded.

The first switch group SW1 may turn on/off unidirectional current from the vertical axis power supply module 230 to each of the plurality of stacks 311, 312, 361, and 362, thereby enabling stack charging of each of the stacks 311, 312, 361, and 362 with the power of the vertical axis power supply module. For example, when only the eleventh switch sw11 is turned on, it is possible to charge the first capacitor stack 311 with the output power of the vertical axis power supply module 230. The switches sw11 to 14 may include reverse current prevention units to prevent current from flowing into the vertical axis power supply module 230.

Each switch sw21 and sw22 of the second switch group SW2 may be disposed on a connection line that connects the load connection line A to the first and second battery stacks 361 and 362.

Each switch sw21 and sw22 of the second switch group SW2 may turn on/off unidirectional current from the load connection line A to each of the first and second battery stack 361 and 362, thereby enabling intermittent switching necessary for inter-stack charging of the battery stack 360 by the capacitor stack 310. For the unidirectional current, the second switch group SW2 may include reverse current prevention units to prevent a current from flowing into the load connection line A.

Each switch sw31 and sw32 of the third switch group SW3 may be disposed on a connection line that connects the load connection line A to the first and second capacitor stacks 311 and 312.

The third switch group SW3 may turn on/off unidirectional current from each of the first and second capacitor stacks 311 and 312 to the load connection line A, thereby performing switching necessary for discharge of the capacitor stack 310. For the unidirectional current, the third switch group SW3 may include reverse current prevention units to block output current of the load connection line A.

Each switch sw41 and sw42 of the fourth switch group SW4 may be disposed on a connection line that connects each of the first and second battery stacks 361 and 362 to the load connection line A.

The fourth switch group SW4 may turn on/off unidirectional current from each of the first and second battery stacks 361 and 362 to the load connection line A, thereby performing switching necessary for discharge of the battery stack 360. For the unidirectional current, the fourth switch group SW4 may include reverse current prevention units to block output current of the load connection line A.

The first switch sw1 may interrupt the connection between the load connection line A and the load 260. The first switch sw1 may be switched on when power is required in the load 260.

The second switch sw2 may interrupt the connection between the load connection line A and the power converter 220. The second switch sw2 may constitute a circuit necessary for cell balancing with the power of the energy storage unit 300, instead of the solar power generator 210, when the power generation of the solar power generator 210 is terminated or stopped. For example, when the thirty-first switch sw31 and the second switch sw2 are switched on, the power of the first capacitor stack 311 may be supplied to the vertical axis power supply module 240 through the power converter 220.

The charge controller 160 may perform module charging using the power (Vh+, Vh−) of the horizontal axis power supply module 240, which will be described below in detail.

The power controller 100 may control charging/discharging of the stacks through switching of the first to fourth switch groups SW1 to SW4. Some of the operations of charging/discharging of each stack are as follows. Switching on of each group means that one or more switches in each group are switched on. All switches are assumed to be switched off by default. In other words, switches not mentioned as being switched on are considered as being switched off.

The power controller 100 may control at least one of the stacks 311, 312, 361, and 362 to be charged with the power of the vertical axis power supply module 230 by switching on the first switch group SW1.

The power controller 100 may control the power of the energy storage unit 300 to be transferred to the load 260 by switching on the first switch sw1 and at least one switch of the third and fourth switch groups SW3 and SW4.

The power controller 100 may switch on each of the second and third switch groups SW2 and SW3 to control inter-stack charging so that the power of the first and second capacitor stacks 311 and 312 is transferred to the first and second battery stacks 361 and 362.

The charge controller 160 may perform control necessary for module charging, which is individual charging of each of the modules C11 to C14, C21 to C24, B11 to B14, and B21 to B24. The module charging may be implemented by individually applying the power (Vh+, Vh−) of the power converter 220, particularly, the horizontal axis power supply module 240, to each module.

The anode and cathode terminals Vh+ and Vh− of the horizontal axis power supply module 240 may be independent of other terminals. However, the cathode Vh− of the horizontal axis power supply module 240 may be common to the cathode Vv− of the vertical axis power supply module 230. There may be a plurality of horizontal axis power supply modules 240.

For convenience of description, a horizontal module group is defined. Some of the plurality of modules B and C that belong to different stacks and are electrically connectable may form a horizontal module group. There may be a plurality of horizontal module groups. Referring to FIG. 4, a first horizontal module group may be composed of the fourteenth and twenty-fourth capacitor modules C14 and C24, and a second horizontal module group may be composed of the thirteenth capacitor module C13, the twenty-third capacitor module C23, the thirteenth battery module B13, and the twenty-third battery module B23.

The charge controller 160 may be divided into a plurality of charge control modules and functions may be implemented. For example, a first charge control module may perform control necessary for module charging of modules belonging to the first and second horizontal module groups among the plurality of horizontal module groups. Hereinafter, the description of the charge controller 160 will be substituted by the description of the first charge control module with reference to FIG. 4.

Referring to FIG. 4, the first charge control module may include a circuit composed of a plurality of switches sw101 to sw104, sw201 to sw204, sw301 to sw304, T31, and T32, and multiple lines L1 to L3, and may control switching of the switches.

A first line L1 may be connected to a horizontal axis anode Vh+. A second line L2 may be connected to either the horizontal axis anode Vh+ or a horizontal axis cathode Vh−. A third line L3 may be connected to the horizontal axis cathode Vh−.

A first three-way (triple-pole) switch T31 may connect the horizontal axis anode Vh+ and the first line L1 at a first contact point and may connect the horizontal axis anode Vh+ and the second line L2 at a second contact point.

A second three-way switch T32 may connect the horizontal axis cathode Vh− and the second line L2 at a first contact point and may connect the horizontal axis cathode Vh− and the third line L3 at a second contact point.

A first line switch group (sw101 to sw104) among module-specific power supply switches sw101 to 104, sw201 to 204, and sw310 to 304 may interrupt the connection between a positive terminal of the first horizontal module group (C14 and C24) and the first line L1. In the present embodiment, it is preferable that one-hundred-and-third and one-hundred-and-fourth switches sw103 and sw104 are omitted or always switched off.

A second line switch group (sw201 to sw204) among the module-specific power supply switches sw101 to 104, sw201 to 204, and sw310 to 304 may interrupt the connection between a positive terminal of the second horizontal module group (C13, C23, B13, and B23) and the second line L2. In addition, the second line switch group (sw201 to sw204) may interrupt the connection between a negative terminal of the first horizontal module group (C14 and C24) and the second line L2.

A third line switch group (sw301 to sw304) among the module-specific power supply switches sw101 to 104, sw201 to 204, and sw310 to 304 may interrupt the connection between a negative terminal of the second horizontal module group (C13, C23, B13, and B23) and the third line L3.

Some of operation examples are as follows.

The first charge control module may control only the fourteenth capacitor module C14 to be charged. In this case, the first charge control module may control each of the first and second three-way switches T31 and T32 to be in a first contact point state, and control the one-hundred-and-first and two-hundred-and-first switches sw101 and sw201 to be switched on. By doing so, it is possible to connect the first line L1 and the horizontal axis anode Vh+ and to connect the second line L2 to the horizontal axis cathode Vh−. The fourteenth capacitor module C14 may be connected to the horizontal axis anode Vh+ and the horizontal axis cathode Vh− via the first and second lines L1 and L2.

The first charge control module may control only the thirteenth battery module B13 to be charged. In this case, the first charge control module may control each of the first and second three-way switches T31 and T32 to be in a second contact point state, and control the two-hundred-and-third and three-hundred-and-third switches sw203 and sw303 to be switched on. By doing so, it is possible to connect the second line L2 and the horizontal axis anode Vh+ and to connect the third line L3 and the horizontal axis cathode Vh−. The thirteenth battery module B13 may be connected to the horizontal axis anode Vh+ and the horizontal axis cathode Vh− via the second and third lines L2 and L3.

The charge controller 160 may charge only one row of capacitor modules C or may individually charge groups, each consisting of three or more rows of capacitor modules C, according to a circuit configuration.

In addition to abnormal weather conditions, the charge controller 160 may individually charge one of the capacitor modules and the battery modules for cell balancing. That is, the charge controller 160 according to the present invention may perform an active cell balancing function, and hence a separate cell balancing circuit can be omitted. Additionally, the charge controller 160 may further perform a passive cell balancing function. To this end, the charge controller 160 may further include a configuration component (e.g., a resistor) that consumes power of a corresponding module so that an appropriate circuit configuration may be achieved.

Hereinafter, control of the power controller 100 according to the charging policy or the discharging policy will be described.

The power controller 100 may select one of a charging mode and a discharging mode according to preset policies. The charging mode may include a stack charging mode, a module charging mode, and an inter-module charging mode. The discharging mode means that power of at least one of the solar power genera tor 210 and the energy storage unit 300 is applied to the load 260. The power controller 100 may control the charging mode and the discharging mode to be simultaneously activated.

The power controller 100 may control the energy storage unit 300 to be suitably charged/discharged according to the input/output power characteristics of the power converter 220 and charging/discharging conditions. The charging/discharging conditions may include at least one of a charging end voltage, a maximum charging voltage, a maximum power point of the input power, and a minimum discharge voltage of the energy storage unit 300. The charging end voltage refers to an end voltage charged in the energy storage unit 300 to prevent overcharging during charging, the maximum charging voltage refers to a maximum voltage that can be input to the energy storage unit 300, and the minimum discharging voltage refers to a minimum voltage for preventing an over-discharge of the energy storage unit 300.

The standalone solar-photovoltaic street light will be described as one embodiment. When thirteen supercapacitor modules (3,400 F, 2.85 V, and 3.84 Wh) are configured in series into the capacitor stack 310 and four capacitor stacks 310 are configured in parallel, energy of about 200 W can be stored.

When the street light is 20 Wh-LED street light, it can be used for about 10 hours. In this case, a maximum charging voltage may be set to 37.05 V, and a charging end voltage for preventing overcharge may be set to 36.5 V. A maximum power point may be set to 78% of an open-circuit voltage of the solar power generator 210. The power controller 100 may compare the input voltage of the power converter 220 with the output voltage and control the driving of the power converter 220 such that the maximum power point of the input power is maintained. Maintaining the maximum power point enables high charging efficiency.

The power controller 100 may compare the storage voltage of the energy storage unit 300 with the charging end voltage and control the driving of the power converter 220 so as not to overcharge during charging.

The power controller 100 may compare the storage voltage of the energy storage unit 300 with the minimum discharging voltage and control the switching of the discharge-related switches sw31, sw32, sw41, and sw42 so as not to over discharge during discharging. In the case of the standalone solar photovoltaic street light according to the present invention, the minimum discharging voltage may be set to 5 V.

The charging policy may be applied during a predetermined daytime period or when sunlight condition is good.

The power controller 100 may be set a charging mode to one of the stack charging mode, the module charging mode, and the inter-module charging mode or to a combination mode of two or more of the stack charging mode, the module charging mode, and the inter-module charging mode, according to the weather condition.

Various combination modes may be possible. An embodiment of the combination mode is as described below.

In a first example of the combination mode, the power controller 100 may perform stack charging of the first capacitor stack 311 and simultaneously perform module charging of any one of the capacitor modules C of the second capacitor stack 312. This combination mode may be useful when there is insufficient solar power to charge two stacks or when cell balancing for one of the capacitor modules C in the second capacitor stack 312 is performed.

In a second example of the combination mode, the power controller 100 may individually charge any one of the capacitor modules C11 to C14 of the first capacitor stack 311 (module charging) and at the same time may charge the first battery stack 361 with the second capacitor stack 312 (inter-stack charging). This mode may be useful when the solar power is insufficient to charge one stack. That is, the battery stack may be charged with the first capacitor stack which is fully charged or has sufficient power, and the capacitor modules may be sequentially charged with insufficient solar power, thereby charging the second capacitor stack having the modules.

In a third example of the combination mode, the power controller 100 may individually charge any one (e.g., C11) of the capacitor modules of the first capacitor stack 311 and any one (e.g., B11) of the battery modules of the first battery stack 361 (module charging). This example may be a modification of the second example of the combination mode described above. For example, the eleventh capacitor module C11 may be charged with the solar-generated power and the eleventh battery module B11 may be charged with the power of the second capacitor stack 312. The power controller 100 may control the thirty-second switch sw32 and the second switch sw2 to be switched on so that the power of the second capacitor stack 312 is applied to the eleventh battery module B11. In this case, it may be preferable that a plurality of horizontal axis power supply modules 240 are provided such that the power applied to the power converter 220 from the second capacitor stack 312 is managed separately from the solar-generated power.

The power controller 100 may alternately set the second and third examples of the combination mode so that cell balancing for the battery module is performed while the battery stack is being charged. The charging modes according to the charging policy may further include a stack power module charging mode, which is part of the third example of the combination mode, and in which one of modules in one stack is charged using power of another stack. In the stack power module charging mode, the power of a stack may be input to the power converter 220 and converted into an appropriate power. In the stack power module charging mode, multiple modules may be sequentially charged so that a stack consisting of the corresponding modules may be fully charged. In addition, when cell balancing is required, the stack power module charging mode may be activated.

The stack power module charging mode may be part of the inter-stack charging mode or the module charging mode. In the stack power module charging mode, it is preferable that the power of a stack is power of a capacitor stack and the module is a battery module.

In the charging policy, it may be preferable that a basic policy is a stack charging mode. Under normal weather condition (normal charging condition) in which sufficient input power can be acquired, the power controller 100 may set the stack charging mode or be kept in the stack charging mode.

In the stack charging mode, it is preferable that the power controller 100 may first charge the capacitor stack 310 and then charge the battery stack 360. When a storage voltage of the first capacitor stack 311 is lower than a storage voltage of the second capacitor stack 312, the power controller 100 may preferably charge the first capacitor stack 311 first. For the inter-module charging mode, a charging voltage of the capacitor stack 310 is preferably set to be higher than a storage voltage of the battery stack 360.

When the input power of the power convertor 220 is lower than a set voltage due to the weather condition, such as rainy or cloudy, (abnormal charging condition) while the solar power generator 210 is generating power, the solar power generator 210 may set the charging mode to at least module charging mode among the module charging mode and the inter-stack charging mode.

Under the abnormal charging condition, the power controller 100 may preferably start in the module charging mode first. The capacitor module C may be preferably first charged with the solar power. This is because the capacitor has a longer charging/discharging lifespan than the battery.

Under the abnormal charging condition, when the capacitor stack is fully charged, the power controller 100 may control the inter-stack charging mode to be activated. It is preferable that the power controller 100 maintains the module charging module as long as allowed by the solar power.

In the module charging mode, it is preferable that the power controller 100 charges only the capacitor module C through the charge controller 160.

The charging order may be set to either fully charge each module, starting from the lowest module among all capacitor modules C or charge starting from the capacitor module C of the lowest capacitor stack 310. In the latter case, it is preferable to start charging from the lowest capacitor module C of the corresponding capacitor stack 310.

When only the first capacitor stack 311 is fully charged by module charging under the abnormal charging condition, the power controller 100 may charge one of the first and second battery stacks 361 and 362 with the first capacitor stack 311, and perform module charging on the second capacitor stack 312.

When the solar-generated power cannot output a high voltage due to a weather condition, the battery stack 360 may be charged through the module charging and the inter-stack charging.

When the storage voltage of the energy storage unit 300 is a charging end voltage, the power controller 100 may disable the charging mode to prevent overcharging. The power controller 100 may control excess power of the solar power generator 210 to be consumed at the load 260 even when it is not in a discharge start mode.

The power controller 100 may perform cell balancing through module charging. The cell balancing means that voltages of modules of the same stack are all equal to each other. Therefore, the module charging may be performed under normal condition or even when the power generation of the solar power generator 210 is stopped or terminated.

For example, when the module voltages are high in the order of the eleventh capacitor module C11 to the fourteenth capacitor module C14 (from lowest to highest), the power controller 100 may increase a voltage of the fourteenth capacitor module C14 to a voltage of the eleventh capacitor C11 through the module charging, and may increase a voltage of the eleventh capacitor module C11 in the order of the thirteenth capacitor module C13 and the twelfth capacitor module C12.

There may be a case in which cell balancing is required even when power generation of the solar power generator 210 is stopped or terminated. For example, it is assumed that cell balancing for the first battery stack 361 is completed and cell balancing for the first capacitor stack 311 is incomplete.

In this case, the power controller 100 may control the forty-first switch sw41 to be ON, thereby enabling the first battery stack 361 to be connected to the load connection line A. The power controller 100 may control the first switch sw1 to be OFF and the second switch sw2 to be ON so that power of the first battery stack 361 can be input to the power converter 220, that is, the horizontal axis power supply module 240. Then, the power controller 100 may control a module requiring cell balancing to be charged.

The power controller 100 may determine whether a module that is being charged is defective on the basis of charging time of the module. For example, when a time taken to complete charging of the module is shorter than a preset time or when a charging end voltage is not reached even when the charging time exceeds a predetermined period of time, the power controller 100 may determine that the corresponding module is defective and notify the determination to an administrator.

The discharging policy may be applied during a preset night time period or under very dark weather condition.

The power controller 100 may start in a 100%-discharge mode through the load control module and turn on the street light. When a preset time has elapsed, in a preset time period (late nighttime), or when a storage voltage of the energy storage unit 300 is lower than or equal to a preset voltage, the power controller 100 may control power to be consumed at the load 260 at a rate lower than 100 through the load control module. For example, the power controller 100 may select one of 80%, 60%, and 40% as a discharge rate of the energy storage unit 300 or sequentially decrease the discharge rate.

When the storage voltage of the energy storage unit 300 is lower than or equal to the minimum discharge voltage, the power controller 100 may disable the discharging mode to prevent over-discharge.

The hybrid charging/discharging solar energy storage apparatus according to the embodiments of the present invention may provide a stack charging mode for individually charging stacks, an inter-stack charging mode for charging a battery stack with power of a capacitor stack, and a module-specific charging mode for individually charging modules, and thereby stable charging is possible.

In addition, a capacitor module having a long charging/discharging cycle is first charged so that a battery having a relatively shorter charging/discharging cycle can be used at optimal condition for a long period of time.

The present invention may be implemented in hardware or in software. Also, the present invention may be implemented as computer-readable code stored in a computer-readable storage medium. That is, the present invention may be implemented in the form of a recording medium including computer executable instructions. A computer-readable medium may be any usable medium that can be accessed by a computer and may include all volatile and nonvolatile media and detachable and non-detachable media. Also, the computer-readable medium may include all computer storage media and communication media. The computer storage medium includes all volatile and nonvolatile media and detachable and non-detachable media implemented by a certain method or technology for storing information such as computer-readable instructions, data structures, program modules, or other data. The communication medium typically includes computer-readable instructions, data structures, program modules, other data of a modulated data signal such as a carrier wave, or other transmission mechanisms, and includes information transmission media. Also, functional programs, codes, and code segments for accomplishing the present invention can be easily construed by programmers skilled in the art to which the present invention pertains.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A hybrid charging/discharging solar energy storage apparatus, comprising:
   a solar power generator configured to receive incident solar light and generate electricity;
   a power converter configured to receive at least power generated by the solar power generator as input power and convert the input power into output power by changing a voltage of the input power;
   an energy storage unit comprising a plurality of modules configured to store power;
   a load connection line connected to a load configured to consume power of at least one of the power converter and the energy storage unit; and
   a power controller configured to control charging and discharging of the energy storage unit according to preset charging/discharging policies,
   wherein some of the plurality of modules that are connected in series constitute a plurality of stacks,
   the plurality of stacks are divided into a capacitor stack group of capacitor stacks consisting of capacitor modules and a battery stack group of battery stacks consisting of battery modules,
   a charging policy of the charging/discharging policies includes
   a stack charging mode in which at least one stack of the plurality of stacks is charged with the output power,
   a module charging mode in which at least one module belonging to the plurality of stacks is charged with the output power, and
   an inter-stack charging mode in which at least one stack of the battery stack group is charged with power of at least one stack of the capacitor stack group,
   and the power controller controls charging in at least one of the stack charging mode, the module charging mode, and the inter-stack charging mode, according to the charging policy.

2. The hybrid charging/discharging solar energy storage apparatus of claim 1, wherein the power controller comprises:
   a first switch group configured to interrupt unidirectional current from the power controller to the plurality of stacks;

a second switch group configured to interrupt unidirectional current from the load connection line to the plurality of battery stacks;

a third switch group configured to interrupt unidirectional current from the capacitor stack group to the load connection line; and a fourth switch group configured to interrupt unidirectional current from the battery stack group to the load connection line, and the power controller controls stack charging through switching of the first switch group, control inter-stack charging using the second and third switch groups, and control stack discharging using the third and fourth switch groups.

3. The hybrid charging/discharging solar energy storage apparatus of claim 1, wherein the power controller starts in the stack charging mode at the start of charging, and when the solar power generator is generating electricity and an input voltage of the power converter is lower than a preset voltage, which is an abnormal charging condition, the power controller controls charging in at least one of the module charging mode and the inter-stack charging mode and an initial starting mode is the module charging mode.

4. The hybrid charging/discharging solar energy storage apparatus of claim 3, wherein when the solar power generator is generating electricity, the power controller continuously performs the module charging and the module charging is performed on at least one of the plurality of capacitor modules.

5. The hybrid charging/discharging solar energy storage apparatus of claim 3, wherein the inter-stack charging mode includes a stack power module charging mode in which a module of one stack of the plurality of stacks is charged using power of another stack of the plurality of stacks.

6. The hybrid charging/discharging solar energy storage apparatus of claim 1, wherein the power controller performs cell balancing through the module charging for a module having a lower voltage than those of the other modules in the same stack, thereby increasing a voltage of the corresponding module.

7. The hybrid charging/discharging solar energy storage apparatus of claim 6, wherein when power generation of the solar power generator is terminated and the cell balancing through the module charging is required, the power controller connects power of at least one stack that does not need cell balancing among the plurality of stacks to an input terminal of the power converter and performs the module charging.

8. The hybrid charging/discharging solar energy storage apparatus of claim 1, wherein the power controller determines whether a module that is being charged is defective, on the basis of charging time of the module.

9. The hybrid charging/discharging solar energy storage apparatus of claim 1, wherein the power converter includes a vertical axis power supply mode and a horizontal axis power supply module, the vertical axis power supply module converts the input power into power necessary for the stack charging and supplies the converted power, and the horizontal axis power supply module converts the input power into power necessary for the module charging and supplies the converted power.

10. The hybrid charging/discharging solar energy storage apparatus of claim 9, further comprising:

a charge control module configured to charge modules belonging to a first horizontal module group and a second horizontal module group of horizontal module groups consisting of modules that are electrically connectable to each other and belonging to different stacks among the plurality of modules, wherein the charge control module includes a first line connected to an anode of the horizontal power supply module, a second line connected to one of the anode and a cathode of the horizontal axis power supply module, a third line connected to the cathode of the horizontal axis power supply module;

a first three-way switch connecting the anode of the horizontal axis power supply module to one of the first and second lines, a second three-way switch connecting the cathode of the horizontal axis power supply module to one of the second and third lines, a first switch disposed between the first and second lines and configured to interrupt the first line and an anode of a first module in the first horizontal module group, a second switch disposed between the second and third lines and configured to interrupt the second line and an anode of a second module in the second horizontal module group, and a third switch configured to interrupt a cathode of the second module and the third line, and a cathode of the first module and the anode of the second module are electrically connected to each other.

11. The hybrid charging/discharging solar energy storage apparatus of claim 10, wherein the charge controller charges one of the first and second modules, controls the first and second three-way switches and the first and second switches so that the first module is connected to the anode and the cathode of the horizontal axis power supply module through the first and second lines at the time of charging the first module, and controls the first and second three-way switch and the second and third switches so that the second module is connected to the anode and the cathode of the horizontal axis power supply module through the second and third lines at the time of charging the second module.

* * * * *